(12) United States Patent
Quartiroli et al.

(10) Patent No.: US 10,900,805 B2
(45) Date of Patent: Jan. 26, 2021

(54) COMPENSATED DEMODULATOR FOR IN-PHASE AND QUADRATURE MODULATED SIGNALS, MEMS GYROSCOPE INCLUDING THE SAME AND DEMODULATION METHOD

(71) Applicant: STMicroelectronics S.r.l., Agrate Brianza (IT)

(72) Inventors: Matteo Quartiroli, Broni (IT); Alessandro Mecchia, Vimercate (IT); Paolo Pesenti, Senago (IT); Stefano Facchinetti, Caponago (IT); Andrea Donadel, Meda (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 300 days.

(21) Appl. No.: 15/919,882

(22) Filed: Mar. 13, 2018

(65) Prior Publication Data
US 2018/0274941 A1    Sep. 27, 2018

(30) Foreign Application Priority Data
Mar. 21, 2017 (IT) .................. 102017000031177

(51) Int. Cl.
  *G01C 25/00* (2006.01)
  *G01C 19/5776* (2012.01)
  *H04L 27/22* (2006.01)

(52) U.S. Cl.
  CPC ....... G01C 25/005 (2013.01); G01C 19/5776 (2013.01); H04L 27/22 (2013.01)

(58) Field of Classification Search
  CPC ..... H04L 27/06; H04L 27/063; H04L 27/066; H04L 27/14; H04L 27/152;
  (Continued)

(56) References Cited

U.S. PATENT DOCUMENTS

| | | | |
|---|---|---|---|
| 5,375,146 A | * | 12/1994 | Chalmers ................ H04B 1/30 375/344 |
| 6,553,833 B1 | | 4/2003 | Funk et al. |

(Continued)

FOREIGN PATENT DOCUMENTS

JP    11-142161 A    5/1999

OTHER PUBLICATIONS

"Delta-sigma modulation," Wikipedia, Aug. 11, 2016, retrieved from https://en.wikipedia.org/w/index.php?title=Delta-sigma_modulation&oldid=733924406 on Nov. 12, 2017, 14 pages.

(Continued)

*Primary Examiner* — Young T. Tse
(74) *Attorney, Agent, or Firm* — Seed IP Law Group LLP

(57) ABSTRACT

A demodulator for demodulating the in-phase component of an input signal which is in-phase and quadrature modulated. The demodulator includes a register storing a phase calibration value and a temperature sensor that performs a plurality of temperature sensings. A compensating stage generates for each temperature sensed a corresponding first sample on the basis of the difference between the sensed temperature and a calibration temperature and a compensation function indicative of a relationship existing between the phase of the input signal and the temperature. A combination stage generates a plurality of second samples, each second sample being a function of the phase calibration value and a corresponding first sample. A generating stage generates a demodulating signal having a phase which depends on the second samples and a demodulating stage demodulates the input signal by means of the demodulating signal.

20 Claims, 5 Drawing Sheets

(58) Field of Classification Search
CPC ... H04L 27/1525; H04L 27/22; H04L 27/227; H04L 27/2271; H04L 27/2272; H04L 27/2275; G01C 19/56; G01C 19/5776; G01C 25/005
USPC ....... 375/316, 324–327, 329, 332, 340, 346; 329/304, 307, 308, 325, 345, 371
See application file for complete search history.

(56) References Cited

U.S. PATENT DOCUMENTS

| | | |
|---|---|---|
| 7,567,611 B2 | 7/2009 | Chien |
| 7,680,196 B2 | 3/2010 | Azuma |
| 8,364,401 B2 | 1/2013 | Da Silva et al. |
| 8,459,109 B2 * | 6/2013 | Caminada .......... G01C 19/5712 73/504.12 |
| 8,687,684 B1 | 4/2014 | Huynh |
| 9,575,089 B1 | 2/2017 | Cazzaniga et al. |
| 9,625,272 B2 | 4/2017 | Tao et al. |
| 2003/0206603 A1 | 11/2003 | Husted |
| 2005/0227642 A1 | 10/2005 | Jensen |
| 2006/0079195 A1 | 4/2006 | Beamish et al. |
| 2007/0099570 A1 | 5/2007 | Gao et al. |
| 2008/0025381 A1 | 1/2008 | Lee et al. |
| 2008/0205536 A1 | 8/2008 | Lee et al. |
| 2010/0027689 A1 | 2/2010 | Kohlmann |
| 2010/0142648 A1 | 6/2010 | Yu et al. |
| 2011/0013724 A1 | 1/2011 | Metreaud et al. |
| 2011/0026643 A1 | 2/2011 | Ruelke et al. |
| 2011/0128992 A1 | 6/2011 | Maeda et al. |
| 2012/0028594 A1 * | 2/2012 | Rao ........................ H03D 3/009 455/207 |
| 2012/0263262 A1 | 10/2012 | Etemadi |
| 2013/0031950 A1 | 2/2013 | Donadel et al. |
| 2013/0223571 A1 | 8/2013 | Dark et al. |
| 2014/0056337 A1 | 2/2014 | Kesling et al. |
| 2014/0190258 A1 | 7/2014 | Donadel et al. |
| 2014/0300425 A1 * | 10/2014 | Cazzaniga ......... G01C 19/5776 331/154 |
| 2015/0057959 A1 | 2/2015 | Ezekwe |
| 2015/0192415 A1 | 7/2015 | Ge et al. |
| 2015/0236739 A1 | 8/2015 | Montalvo et al. |
| 2016/0091339 A1 | 3/2016 | Weinberg et al. |
| 2016/0161256 A1 | 6/2016 | Lee et al. |
| 2017/0070299 A1 | 3/2017 | Hagiwara et al. |
| 2017/0102248 A1 | 4/2017 | Maurer et al. |
| 2017/0184400 A1 | 6/2017 | Valzasina et al. |
| 2017/0328712 A1 | 11/2017 | Collin et al. |
| 2017/0328735 A1 * | 11/2017 | Beaulaton .......... G01C 19/5726 |
| 2018/0209816 A1 | 7/2018 | Hodjat-Shamami et al. |
| 2019/0145773 A1 | 5/2019 | Collin et al. |

OTHER PUBLICATIONS

"Noise shaping," Wikipedia, Jan. 19, 2017, retrieved from https://en.wikipedia.org/w/index.php?title=Noise_shaping&oldid=760867075 on Nov. 12, 2017, 4 pages.

* cited by examiner

COMPENSATED DEMODULATOR FOR IN-PHASE AND QUADRATURE MODULATED SIGNALS, MEMS GYROSCOPE INCLUDING THE SAME AND DEMODULATION METHOD

BACKGROUND

Technical Field

This disclosure relates to a compensated demodulator for in-phase and quadrature modulated signals and a microelectromechanical system (MEMS) gyroscope including the same. The disclosure also relates to a demodulation method.

Description of the Related Art

As is known, so-called MEMS gyroscopes which are angular velocity sensors capable of sensing an external stimulus due to the Coriolis force are now available. The Coriolis force is in turn an inertial force acting on a moving mass which moves with respect to a rotating reference frame, the force being proportional to the velocity of the moving mass and the angular velocity of the frame.

By way of example FIG. 1 shows a MEMS gyroscope 1 formed by a first die 2 of semiconductor material (typically silicon), which in turn forms an oscillating system 4. Although not shown in detail, the oscillating system 4 includes one or more moving masses of semiconductor material which oscillate with respect to a frame (not shown), to which they are attached by means of springs (not shown); the frame is also formed by the first die 2. In addition to this, assuming an orthogonal xyz reference system which is of one piece with the frame, when in use the moving masses oscillate along a direction parallel to, for example, the x axis, which is also referred to as the driving direction.

More particularly, the driving electrodes 6 are present in the first die 2; in addition to this, the MEMS gyroscope 1 also comprises a second die 8 within which there is formed a driving circuitry 10 which is electrically connected to the driving electrodes 6, to which it provides one or more driving signals; in what follows it will be assumed for simplicity that only a single driving signal is present. The driving electrodes 6 are in turn capacitively coupled to the moving masses in such a way that electrostatic forces which depend on the driving signal and are such as to keep the moving masses in oscillation parallel to the driving direction are set up between the moving masses and the driving electrodes 6.

Further electrodes 12 are also present on the first die 2, and these will be referred to as the first sensing electrodes 12. The first sensing electrodes 12 are capacitively coupled to the moving masses so as to form variable capacitors with the latter, the capacitance values of which are indicative of the positions of the moving masses along the driving direction. In addition to this, the first sensing electrodes 12 are electrically coupled to the driving circuitry 10 in such a way that the driving circuitry 10 receives a first sense signal indicative of the capacitance of the abovementioned variable capacitors and therefore the positions of the moving masses along the driving direction. The driving circuitry 10 therefore generates a driving signal as a function of the first sense signal.

In greater detail, the driving signal is generated by the driving circuitry 10 in such a way that the moving masses (or the moving mass, if only one moving mass is present; reference will be made below to a situation with more than one moving mass, by way of example) oscillate with the same frequency $f_d$ which to a first approximation is equal to the mechanical resonance frequency of the oscillating system 4 along the driving direction. In practice, one oscillation mode of the oscillating system 4 is excited.

In order to generate the driving signal, the driving circuitry 10 forms a phase-locked loop (PLL, not shown) which receives the first sense signal as an input; the first sense signal and the driving signal have frequencies equal to the frequency $f_d$ and are locked in phase.

Further electrodes 14, which will be referred to below as second sensing electrodes 14, are also present in the first die 2.

The second sensing electrodes 14 are capacitively coupled to the moving masses in such a way as to form corresponding variable capacitors, the capacitances of which are indicative of the positions of the moving masses with respect to (for example) the z axis, that is with respect to a direction known as a sense direction. In this respect, it should be pointed out that the abovementioned springs are such that the moving masses can not only move parallel to the x axis, but also parallel to the z axis. Furthermore, assuming that MEMS gyroscope 1 rotates parallel to the y axis, it will be found that the moving masses are subjected to Coriolis forces which are directed parallel to the z axis. For example, MEMS gyroscopes are common, which include, each, two moving masses driven so as to move in counterphase along the x axis and experience Coriolis forces that are identical in modulus and have opposite directions parallel to the z axis.

In practice, the velocities of the moving masses not only include components parallel to the driving direction, but also components parallel to the sense direction, which are indicative of the angular velocity experienced by the MEMS gyroscope 1 and are modulated in amplitude with a frequency equal to the abovementioned frequency $f_d$.

From another point of view, the oscillating system 4 has a mechanical transfer function $H_1(t)$ relating to the driving and corresponding movements of the moving masses along the driving direction, and a mechanical transfer function $H_2(t)$ which provides a relationship between the movements of the moving masses along the sense direction and the Coriolis force acting on the moving masses.

The MEMS gyroscope 1 also comprises a processing stage 20 which is formed in the second die 8 and is electrically connected to the second sensing electrodes 14. The processing stage 20 has the ability to translate the variable capacitances of the capacitors formed by the second sensing electrodes 14 into a quantity which is proportional to the angular velocity experienced by MEMS gyroscope 1. Together with the driving circuitry 10, the processing stage 20 therefore forms a control and sensing system for the oscillating system 4 of the MEMS gyroscope 1.

In particular, the processing stage 20 comprises an acquisition stage 22 and a demodulation stage 24, both of the analog type. In addition to this, the demodulation stage 24 comprises a multiplier stage 26, a signal generator 28 and a filtering stage 30.

The acquisition stage 22 is electrically coupled to the second sensing electrodes 14 so that, when in use, it receives a second sense signal as an input, which will be referred to below as the input signal $S_{in}$. The input signal $S_{in}$ is indicative of the capacitance of the variable capacitors formed by the second sensing electrodes 14 and the moving masses, and therefore the positions of the moving masses in the sense direction. The input signal $S_{in}$ is therefore indicative of the angular velocity experienced by the MEMS gyroscope 1. In addition to this, the input signal $S_{in}$ has a frequency of $f_d$ if the angular velocity is constant, or is modulated in amplitude at frequency $f_d$.

The acquisition stage 22 generates a signal at its own output which will be referred to below as the acquired signal $S_{acq}$, which is typically a voltage signal. For this purpose, the acquisition stage 22 includes a capacitance-voltage conversion circuit, which makes it possible to generate a voltage signal (in particular, the acquired signal $S_{acq}$) from a capacitance signal (in particular, the input signal $S_{in}$).

The output of the acquisition stage 22 is connected to a first input of the multiplier stage 26, a second input of which is connected to the output of the signal generator 28; the output of the multiplier stage 26 is connected to the input of the filtering stage 30.

The signal generator 28 generates an intermediate signal $S_{int}$ at its own output in such a way that the multiplier stage 26 generates a product signal $S_{prod}$ at its own output, equal to the product of the intermediate signal $S_{int}$ and the acquired signal $S_{acq}$.

The intermediate signal $S_{int}$ has a frequency equal to abovementioned frequency $f_d$ and is phase locked with the acquired signal $S_{acq}$, and therefore also with the driving signal. For this purpose, the signal generator 28 is connected to the PLL (not shown) formed by the driving circuitry 10.

For example, the intermediate signal $S_{int}$ is proportional to $\cos(\omega_d t + \varphi_{trim})$, where $\omega_d = 2\pi f_d$ and $\varphi_{trim}$ indicates a phase shift introduced during a step of calibrating the signal generator 28 in order ideally to obtain $\varphi_{trim} = \Delta\varphi$, where $\Delta\varphi$ indicates the phase shift introduced by the mechanical transfer function $H_2(t)$ and the acquisition stage 22 with respect to the driving signal. Alternatively, the intermediate signal $S_{int}$ may be equal to a square wave of sgn $[\cos(\omega_d t + \varphi_{trim})]$, where "sgn" indicates the sign function; for simplicity of mathematical analysis, it is assumed below that the intermediate signal $S_{int}$ will be proportional to $\cos(\omega_d t + \varphi_{trim})$, although for practical purposes there will not be any difference.

Subsequently, the filtering stage 30, of the low pass type, generates a demodulated signal $S_{dem}$ in the base band, which is in fact indicative of the abovementioned quantity proportional to the angular velocity of MEMS gyroscope 1. Assuming that the MEMS gyroscope 1 experiences a constant angular velocity, the demodulated signal $S_{dem}$ will be constant.

The demodulated signal $S_{dem}$ is then passed to an analog-to-digital converter 32 formed in the second die 8, which generates a digitized version of the demodulated signal $S_{dem}$. In turn, the analog-to-digital converter 32 is connected for example to a digital signal processor (DSP) 34, which may be formed in the second die 8 and is capable of performing further processing, such as for example filtering, gain and sampling frequency reduction operations. In addition to this, the digital signal processor 34 may be coupled to a display device (not shown) which makes it possible to display the abovementioned quantity proportional to the angular velocity of MEMS gyroscope 1.

From a more quantitative point of view, the acquired signal $S_{acq}$ is equal to $C^*\cos(\omega_d t + \Delta\varphi) + Q^*\sin(\omega_d t + \Delta\varphi)$, in which C is proportional to the Coriolis force, while Q represents the so-called quadrature error.

In more detail, Q represents the error caused by undesired mechanical coupling between the driving mode of the oscillating system 4 and the so-called sense mode of the oscillating system 4. For example, C may be approximately equal to a thousand degrees per second (dps), while Q may be of the order of tens of thousands of dps. In addition to this, Q can be assumed to be constant.

In other words, the acquired signal $S_{acq}$ comprises an in-phase component proportional to the Coriolis force and therefore the angular velocity experienced by the MEMS gyroscope 1, and an undesired quadrature component.

In greater detail, because of inevitable inaccuracies in construction, movement of the moving masses is characterized by the presence of components directed in the sense direction, even if no Coriolis force is present. This movement in the sense direction represents a kind of spurious component which overlaps the useful component caused by the Coriolis force.

As is known, the spurious movement is periodic with a frequency of $f_d$ and is in phase with the first sense signal; in addition to this, the spurious movement has a not at all negligible amplitude, given that this may be an order of magnitude greater than the full scale for MEMS gyroscope 1. More particularly, the spurious movement is equivalent to that induced by a hypothetical quadrature force which depends on a coupling coefficient between the sense mode and the drive mode.

This being the case, the product signal $S_{prod}$ is proportional to $[C^*\cos(\omega_d t + \Delta\varphi) + Q^*\sin(\omega_d t + \Delta\varphi)]^*\cos(\omega_d t + \varphi_{trim})$. Also referring to the phase error $\varphi_{err}$ this to indicate the difference $\Delta\varphi - \varphi_{trim}$, and assuming that error $\varphi_{err}$ tends to zero, the product signal $S_{prod}$ will be approximately proportional to $(C - Q^*(p_{err}) + (C + Q^*\varphi_{err})^*\cos(2\omega_d t) + (Q - C^*\varphi_{err})^*\sin(2\omega_d t)$, and therefore that, after the higher order harmonics have been filtered out by the filtering stage 30, the demodulated signal $S_{dem}$ will be approximately proportional to $(C - Q^*\varphi_{err})$. Given that Q typically has very high values, it will also be noted that minimum calibration values, that is minimum non-null values for the phase error $\varphi_{err}$, give rise to a projection of the quadrature signal onto the in-phase component, with the consequent occurrence of measurement errors.

In greater detail, within the PLL of the driving circuitry 10 there is generated a clock signal having a frequency of $f_{PLL} = N^*f_d$, with N for example equal to 1024, and this is provided to the signal generator 28. The clock signal is phase locked with the first sense signal and with the driving signal; in particular, the clock signal has a zero phase shift with respect to the first sense signal and has a fixed phase shift with respect to the driving signal.

During the calibration step, the value of $\varphi_{trim}$, and therefore the phase of the intermediate signal $S_{int}$, may be varied by an integer number (possibly one) of clock signal cycles, in order to find the value which minimizes the phase error $\varphi_{err}$. Therefore, the resolution $\varphi_{step}$ of the intermediate signal $S_{int}$ in phase is equal to $2\pi^*f_d/f_{PLL}$, that is $2\pi/N$. After calibration, the maximum phase error $\varphi_{err}$ is therefore equal to $\varphi_{err} = \varphi_{step}/2 = \pi/N$. Assuming for example that $Q = 10^4$ dps, $f_{PLL} = 20$ MHz and $f_d = 20$ kHz, we obtain $Q^*\varphi_{step}/2 = 31$ dps.

This being the case, assuming that a perfect calibration is made, that is a calibration such that for $\varphi_{err} = 0$, there will inevitably be changes in the operating conditions experienced by the gyroscope when in use; for example, a change in operating conditions may be caused by a temperature change. Given that a change in the operating conditions in turn causes drift of the amplitude and the phase of the quadrature error Q, there will be degradation of the calibration curves, with a consequent reduction in performance.

In order to compensate for changes in operating conditions, solutions have been proposed which provide for performing realignment operations in the digital domain on the basis of mathematical models; however these solutions have proved to be complex or not very accurate.

BRIEF SUMMARY

The disclosure provides a demodulator for a MEMS gyroscope which makes it possible to overcome at least some of the disadvantages in the known art.

According to the present disclosure, a demodulator and a demodulation method are provided.

In one embodiment of the present disclosure, a demodulator is configured to demodulate the in-phase component of an input signal modulated in-phase and quadrature. The demodulator includes a register configured to store a phase calibration value and a temperature sensor configured to perform a plurality of temperature sensings. A compensation stage is configured to generate a corresponding first sample for each temperature sensed, on the basis of the difference between the detected temperature and a calibration temperature and a compensation function indicative of a relationship existing between the phase of the input signal and temperature. A combination stage is configured to generate a plurality of second samples, each second sample being a function of the phase calibration value and a corresponding first sample. A generation stage is configured to generate a demodulating signal phase locked with the input signal, the demodulating signal having a phase which depends on the second samples. A demodulation stage is configured to demodulate the input signal through the demodulating signal.

In another embodiment, a method for demodulating the in-phase component of an input signal which is in-phase and quadrature modulated includes storing a phase calibration value and performing a plurality of temperature sensings. For each temperature sensed, the method includes generating a corresponding first sample on the basis of the difference between the sensed temperature and a calibration temperature and a compensation function indicative of a relationship existing between the phase of the input signal and the temperature. The method includes generating a plurality of second samples, each second sample being a function of the phase calibration value and the corresponding first sample, generating a demodulating signal phase locked with the input signal, the demodulating signal having a phase which depends on the second samples, and demodulating the input signal by means of the demodulating signal.

BRIEF DESCRIPTION OF THE SEVERAL VIEWS OF THE DRAWINGS

For a better understanding of the present disclosure preferred embodiments will now be described purely by way of non-limiting example and with reference to the appended drawings, in which.

DETAILED DESCRIPTION

The present demodulator derives from an idea by the Applicant which noted that, when phase coherence is maintained with the Coriolis component, it is possible to annul the projection of the quadrature component onto the Coriolis axis, thus compensating for both phase variations and amplitude variations in the quadrature component.

Figure 1:
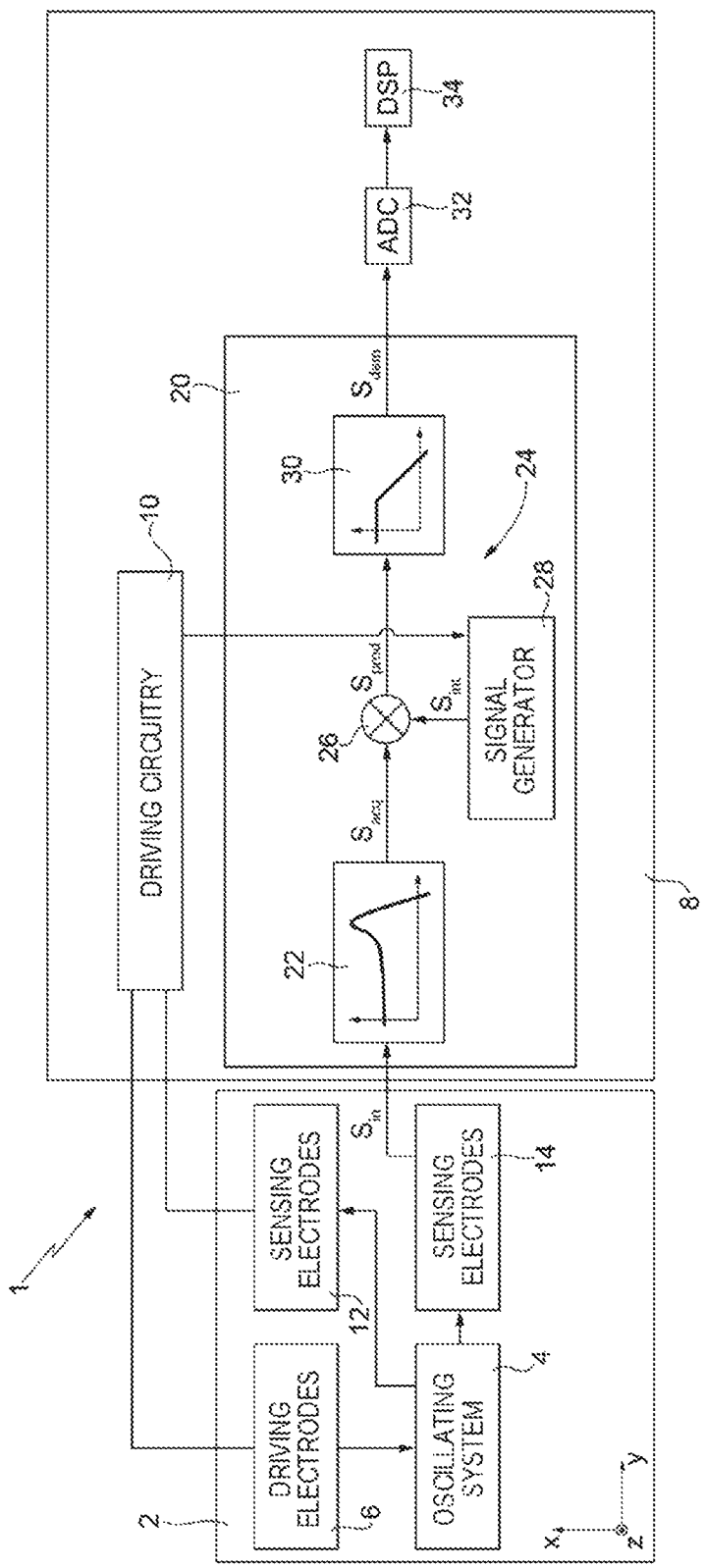
FIG. 1 is a block diagram of a MEMS gyroscope of the known type.
Figure 2:
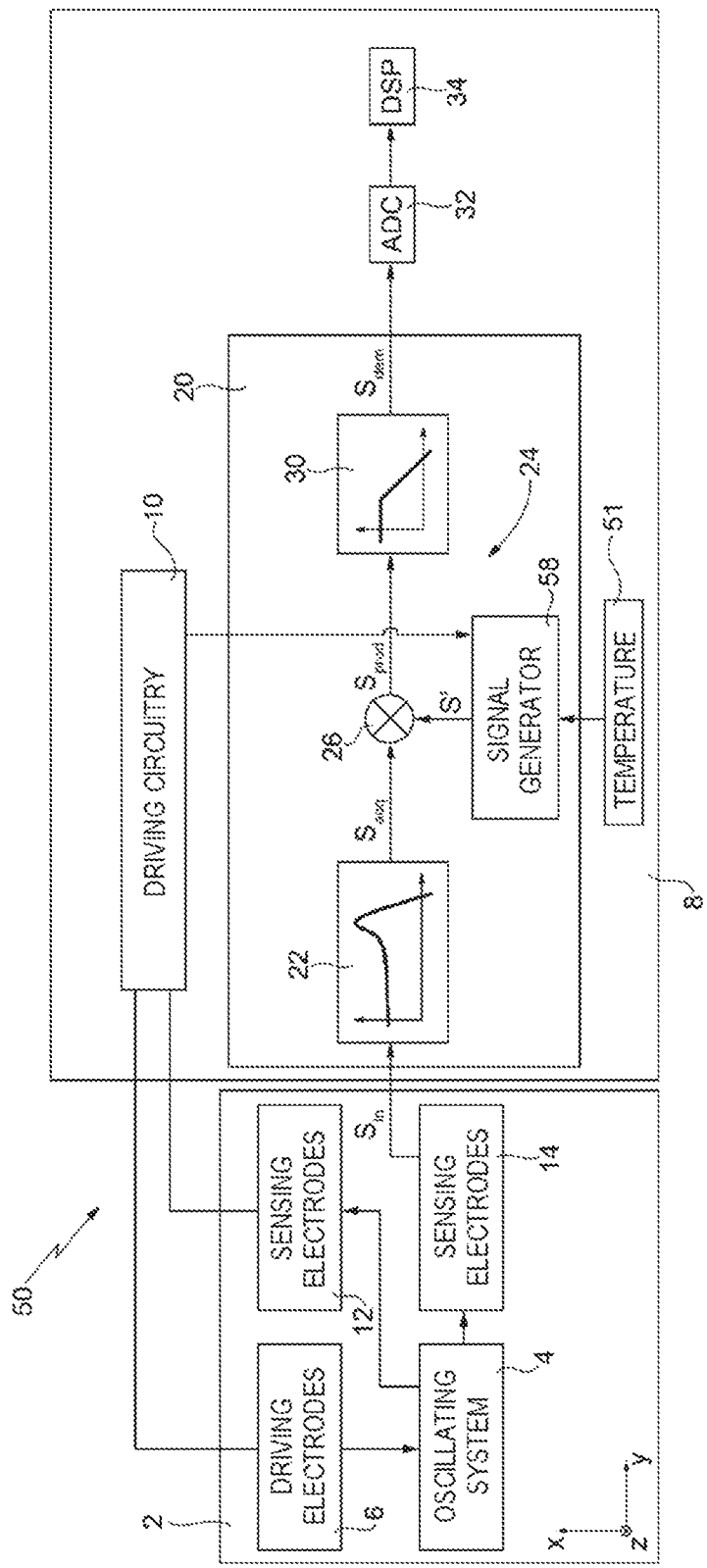
FIG. 2 is a block diagram of a MEMS gyroscope according to one embodiment of the present disclosure.

In greater detail, reference is made below to the MEMS gyroscope 50 shown in FIG. 2, in which components already present in the MEMS gyroscope 1 shown in FIG. 1 are indicated using the same reference numbers, except where specified otherwise. Also, the MEMS gyroscope 50 is described below only in relation to the differences with respect to the MEMS gyroscope 1 shown in FIG. 1.

In detail, the signal generator of MEMS gyroscope 50, indicated by 58, generates a signal S' of the analog type, which will be referred to below as the demodulating signal. In addition to this, a temperature sensor 51, which is electrically coupled to the signal generator 58 so as to provide the latter with a signal indicating the temperature of the MEMS gyroscope 50, is present in the second die 8.

Figure 3:
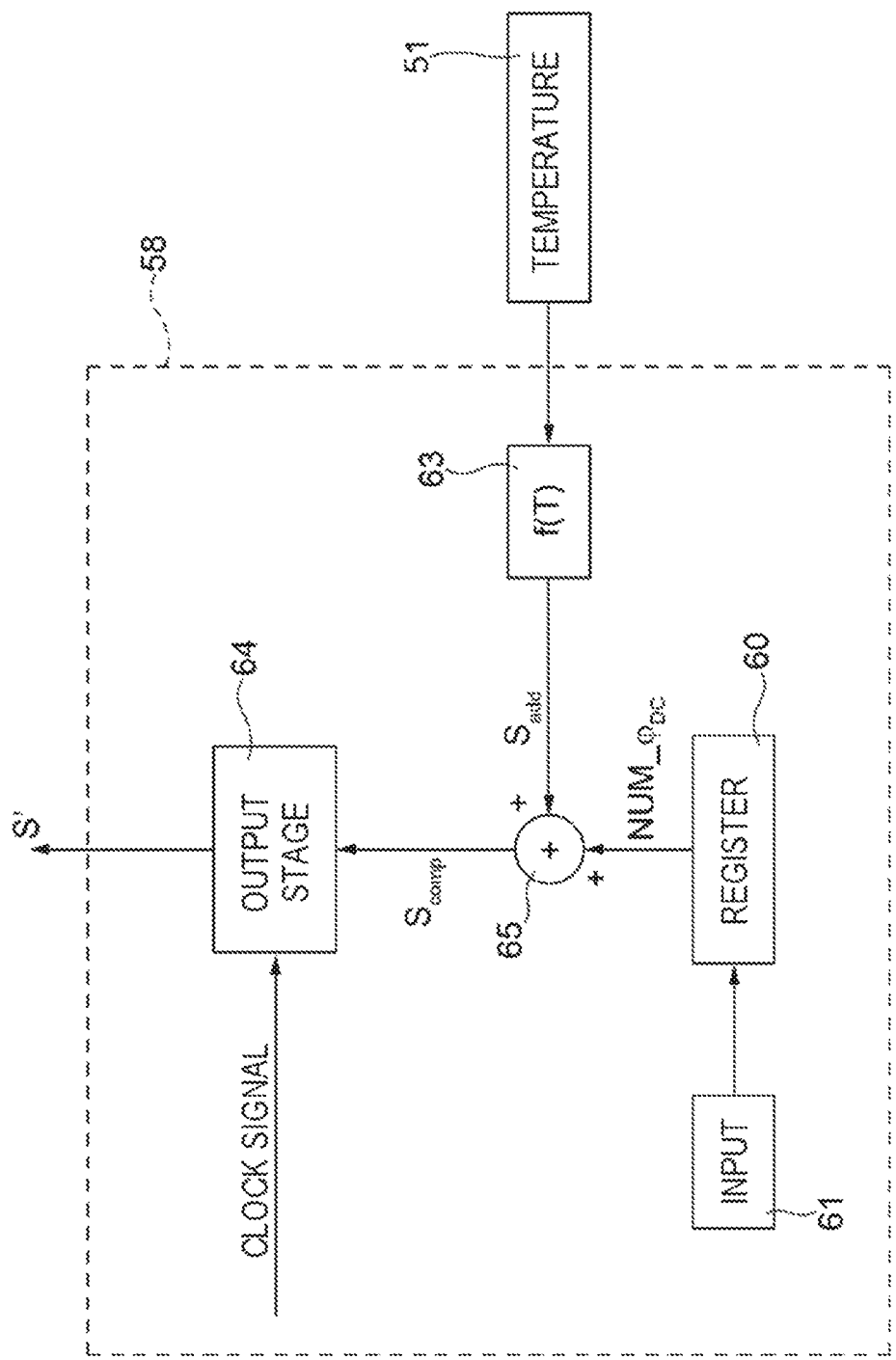
FIG. 3 is a block diagram of a portion of the MEMS gyroscope illustrated in FIG. 2.

In particular, as illustrated in FIG. 3, the signal generator 58 comprises a register 60, an input device 61, a compensation stage 63, a first adder 65 and an output stage 64.

The input device 61 is coupled to the register 60 and can be controlled by a user so as to allow the user to store a desired value in the register 60 from time to time, in particular during calibration. The value stored in the register 60 is referred to below as NUM_$\varphi_{DC}$; this value is described in greater detail below and is an integer number (and may have a sign).

The first adder 65 has a first input connected to the output of the register 60 and a second input connected to the output of the compensation stage 63, the input of which is connected to the temperature sensor 51. The output of the first adder 65 is connected to the input of the output stage 64, at which output the demodulating signal S' is provided.

By referring to the additional signal $S_{add}$ and the compensated signal Scomp to indicate the signals generated by the compensation stage 63 and the first adder 65 respectively, the additional signal $S_{add}$ is formed by a succession of samples NUM_ADD[j] of the integer type with a sign, as described in greater detail below; in addition to this, the compensated signal $S_{comp}$ is equal to the sum of the value NUM_$\varphi_{DC}$ stored in the register 60 and the additional signal $S_{add}$. The compensated signal $S_{comp}$ can therefore be expressed as a succession of samples NUM_$\varphi$comp[j] equal to integer numbers (which may have a sign), as described in greater detail below.

The output stage 64 receives at input not only the compensated signal $S_{comp}$, but also the clock signal generated by the driving circuitry 10. Also the output stage 64 operates at frequency $f_{PLL}$ (as mentioned, with $f_{PLL}=N*f_d$ and N for example equal to 1024) so that the demodulating signal S' is phase locked with the acquired signal $S_{acq}$ and therefore also with the driving signal and with the in-phase and quadrature component of the input signal $S_{in}$. In addition to this, the demodulating signal S' is formed for example by a square wave equal to a sign function with an argument equal to $\cos(\omega_d t+\varphi_{trim}[j])$, or by a sinusoidal signal $\cos(\omega_d t+\varphi_{trim}[j])$ in which $\varphi_{trim}[j]=\varphi_{step}*$NUM_$\varphi$comp[j].

Figure 4:
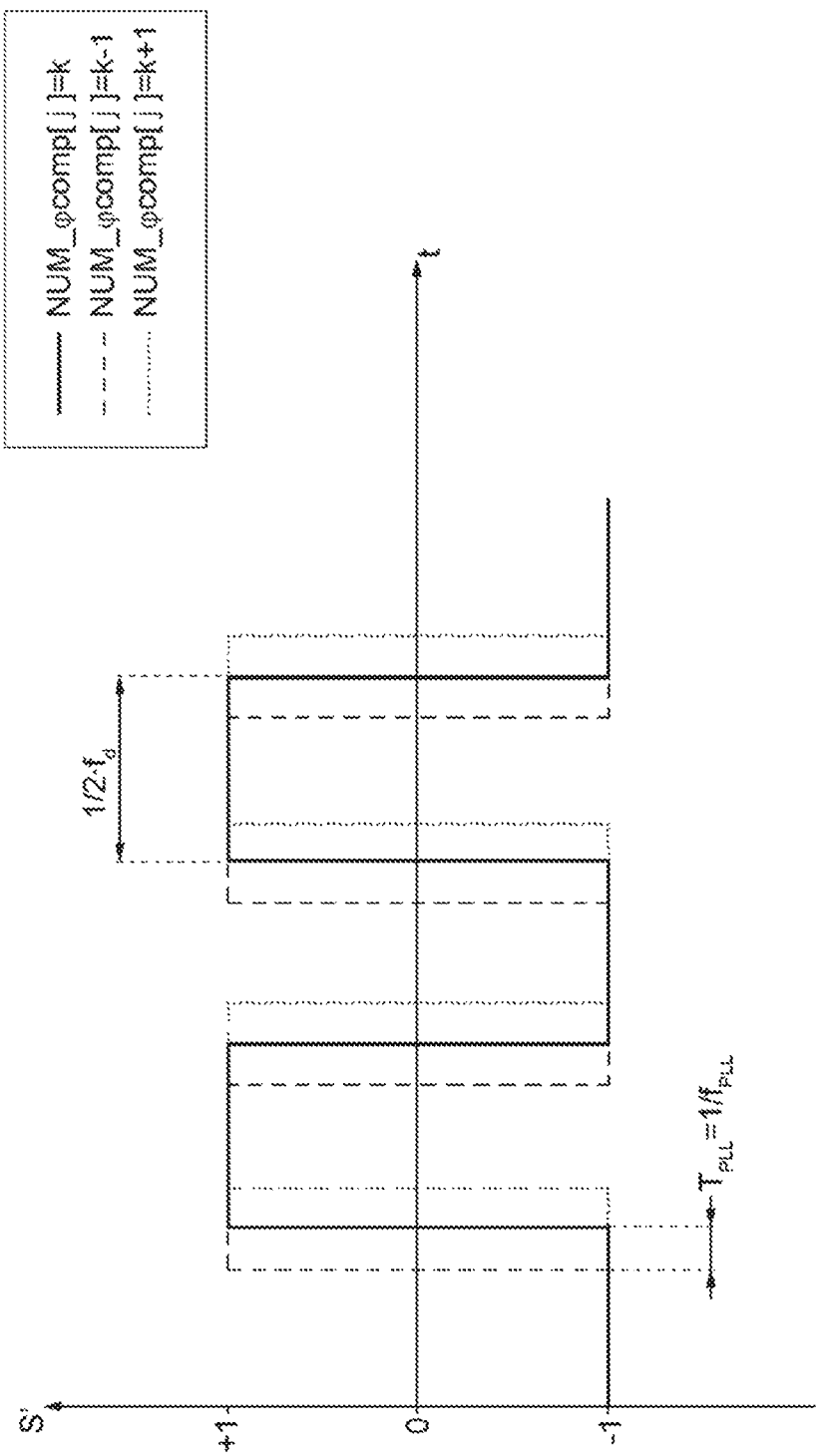
FIG. 4 shows examples of the changes over time in portions of a signal generated in the MEMS gyroscope shown in FIGS. 2 and 3.

It will be assumed below, without any loss of generality, that the demodulating signal S' is equal to the abovementioned square wave. An example of a portion of the demodulating signal S' is shown in FIG. 4. In particular, FIG. 4 shows the phase changes in the demodulating signal S' when the value adopted by NUM_$\varphi$comp[j] varies by ±1 with respect to an example value indicated by k. In this respect, the advance/delay in the leading edge of the demodulating signal S' as a function of the value adopted by NUM_$\varphi$comp

[j] can be seen in FIG. 4; without any loss of generality, each falling edge follows the corresponding leading edge with a delay of $1/(2*f_d)$.

The output stage 64 therefore modulates the phase of demodulating signal S' as a function of the values of the succession NUM_φcomp[j]. More particularly, the phase of the demodulating signal S' depends linearly on NUM_φcomp[j], through a coefficient equal to $\varphi_{step}$.

This being the case, during calibration the additional signal $S_{add}$ is set to zero (that is equal to a succession of zero values) and the user also arranges the MEMS gyroscope 50 in such a way that it has no angular velocity (or has a known angular velocity) and is set to a known temperature. Subsequently, the user varies the value NUM_$\varphi_{DC}$ stored in the register 60 in unitary steps until the value minimizing the value of the abovementioned quantity indicating the angular velocity (or in any event the projection of component Q onto the phase axis) is identified. In other words, during the calibration step, the value NUM_$\varphi_{DC}$ is varied through a plurality of test values to generate corresponding demodulated signals $S_{dem}$ in order to identify the value for which the corresponding demodulated signal $S_{dem}$ exhibits the smallest quadrature error; this value will be used after calibration when the MEMS gyroscope 50 is exposed to an unknown angular velocity. When calibration is complete, NUM_φcomp[j] will therefore be equal to the identified value of NUM_$\varphi_{DC}$; also, ideally NUM_$\varphi_{DC}$*φstep=Δφ.

Once the calibration step is complete, the compensation stage 63 generates the additional signal $S_{add}$ as a function of the temperature values indicated by the temperature signal provided by the temperature sensor 51 that is as a function of the temperature values stored over time by temperature sensor 51. Without any loss of generality, the temperature sensor 51 senses the temperature periodically with a frequency of for example 50 Hz; thus the NUM_ADD[j] samples are also generated with a frequency of 50 Hz.

In greater detail, the compensation stage 63 stores in memory a compensation function which indicates the envisaged changes in phase shift Δφ as temperature varies with respect to the abovementioned known temperature of the calibration step. In addition to this, the compensation stage 63 generates NUM_ADD[j] samples on the basis of the temperature values indicated by the temperature signal provided by the temperature sensor 51 and the compensation function. For example, the relationship NUM_ADD[j]=integer[K1*(T'-T$_0$)] may apply, where T$_0$ indicates the calibration temperature, T' indicates the temperature at the time when the jth sample is generated, while, together with T$_0$, K1 represents the compensation function and is constant, and integer indicates a rounding-off operation to the nearest integer number (with a sign).

Thus NUM_φcomp[j]=NUM_$\varphi_{DC}$+NUM_ADD[j]. To a first approximation, we also obtain NUM_φcomp[j] *$\varphi_{step}$=Δφ(T')=Δφ(T$_0$)+δφ, where Δφ(T$_0$) indicates the value of the phase shift Δφ at the calibration temperature T$_0$; in addition to this, NUM_ADD[j]*$\varphi_{step}$=δφ, where δφ indicates the offset of the phase shift Δφ with respect to the value Δφ(T$_0$), this offset being caused by the change from calibration temperature T$_0$ to temperature T'.

In practice, regardless of the reference used to measure the phases of the demodulating signal S' and the acquired signal $S_{acq}$, the demodulating signal S' is generated in such a way that its phase follows the phase changes in the acquired signal $S_{acq}$ caused by changes in temperature with respect to the calibration temperature. In this way, not only is the impact of phase variations in the quadrature component substantially annulled, but so also is the impact of amplitude variations in the quadrature component. In this respect, it can be shown that, given the jth sample of the compensated signal $S_{comp}$), the demodulated signal $S_{dem}$ is proportional to C*cos [Δφ(T)-$\varphi_{comp}$]-Q*sin [Δφ(T)-$\varphi_{comp}$], which for brevity is written $\varphi_{comp}$=NUM_φcomp[j] *$\varphi_{step}$. The demodulated signal $S_{dem}$ can therefore be approximated using C-Q*[Δφ(T)-$\varphi_{comp}$], and therefore the contribution of Q is annulled even when temperature variations are present.

Figure 5:
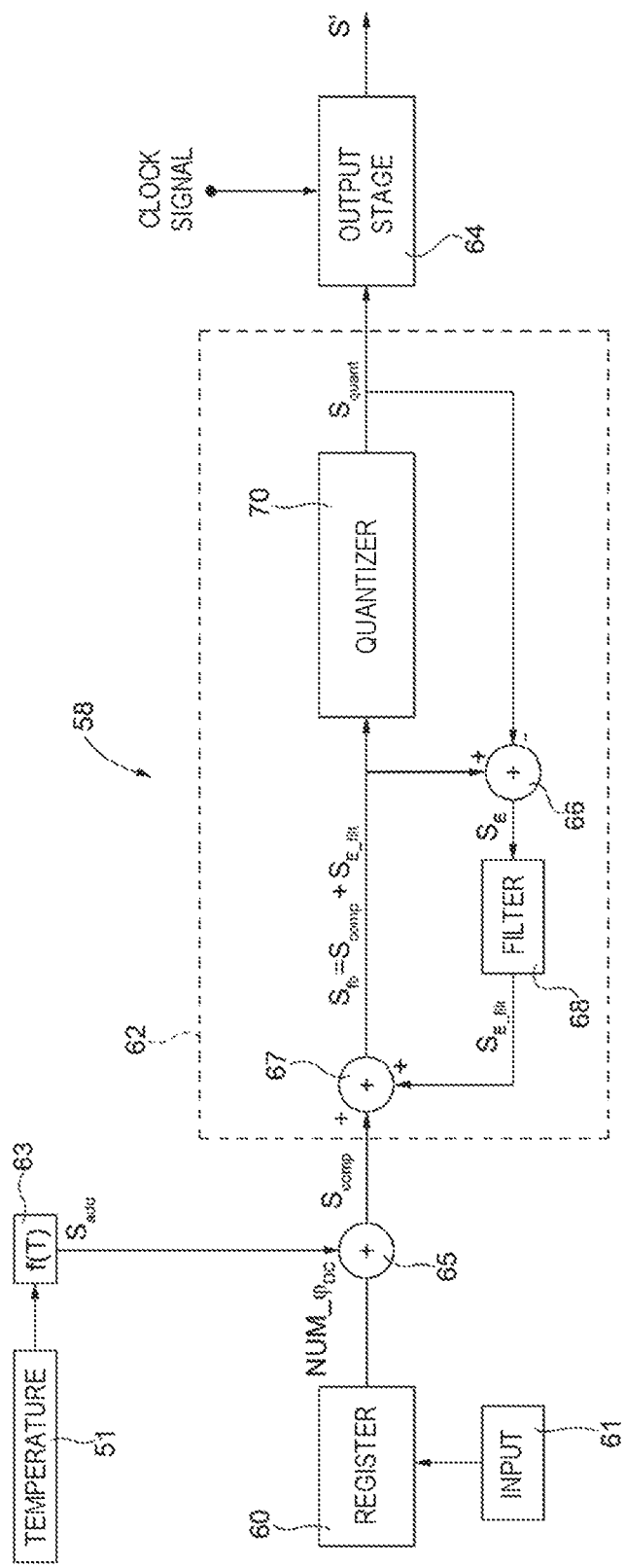
FIG. 5 shows a portion of a different embodiment of the present MEMS gyroscope.

In a different embodiment shown in FIG. 5, the signal generator 58 also comprises a sigma-delta modulator 62 located between the first adder 65 and the output stage 64.

The register 60 is capable of storing a certain number of bits (for example sixteen); in particular, a first part of such bits (for example eight) represents an integer part of the value NUM_$\varphi_{DC}$ stored in register 60, while a second part of such bits (for example eight) represents a fractional part of the value NUM_$\varphi_{DC}$. In practice, during the calibration step the value NUM_$\varphi_{DC}$ is varied in fractional steps, and then at the end of calibration the relationship NUM_$\varphi_{DC}$*$\varphi_{step}$=Δφ will be satisfied with greater accuracy. Also the overall number of bits of the register 60 and the subdivision between the integer part and the fractional part can be selected as a function of the expected amplitude of the phase error and the desired accuracy respectively.

The compensation stage 63 generates the additional signal $S_{add}$ so that the relationship NUM_ADD[j]=K1*(T'-T$_0$) is valid; in addition to this, the samples NUM_ADD[j] and therefore also the sample NUM_φcomp[j] of the compensated signal $S_{comp}$ have an accuracy which is greater than or equal to the accuracy provided by the register 60, and therefore also have a fractional part.

Again with reference to FIG. 5, the output of the first adder 65 is connected to the input of the sigma-delta modulator 62, which is of a type which is in itself known and operates as a so-called noise-shaper. In this respect, without any loss of generality, FIG. 5 shows an embodiment of the sigma-delta modulator 62 comprising a second adder 67, a subtraction circuit 66, a digital filter 68, which will be referred to below as the feedback filter 68, and a quantizer 70. The feedback filter 68 performs a function $H_{noise}(z)$ of the high pass type between its input and the output of the quantizer 70, which spectrally shapes the signal present at the input of the feedback filter 68, which will be referred to below as the signal $S_E$. For this purpose, the feedback filter 68 may have a transfer function $H_f(z)=1-H_{noise}(z)$.

In detail, a first input of the second adder 67 is connected to the output of the first adder 65, while a second input is connected to the output of the feedback filter 68; the output from the second adder 67 is connected to the input of the quantizer 70, and to a first (positive) input of the subtraction circuit 66, the second (negative) input of which is connected to the output of the quantizer 70. The output from the subtraction circuit 66 is connected to the input of the feedback filter 68.

In use, the second adder 67 generates a feedback signal $S_{fb}$ at its own output, which is equal to the sum of the compensated signal $S_{comp}$ and a signal $S_{E\_filt}$ generated by the feedback filter 68 and described in greater detail below. The subtraction circuit 66 generates the abovementioned signal $S_E$ at its own output, the signal $S_E$ being equal to the difference between the feedback signal $S_{fb}$ and the signal present at the output of the quantizer 70, which will be referred to below as the quantized signal $S_{quant}$. Furthermore, the feedback filter 68 generates the abovementioned signal $S_{E\_filt}$.

In greater detail, the quantizer 70 operates at output on a number of bits equal to the bits dedicated to representing the integer part of samples NUM_φcomp[j] of the compensated signal $S_{comp}$. For this purpose, the number of bits dedicated to the integer part of the compensated signal $S_{comp}$ may be greater than the number of bits dedicated to the integer part of the value NUM_φ$_{DC}$, so as to consider the contribution of the additional signal $S_{add}$.

The first and second adders 65, 67, the subtraction circuit 66, the feedback filter 68 and the input of the quantizer 70 operate on a number of bits which is greater than or equal to the number of bits of the register 60. The quantizer 70 therefore brings about a reduction in the number of bits. Although not obvious from the figures, a fractional null part is added to the quantized signal $S_{quant}$ at the input of the subtraction circuit 66 in order to align it digitally with the feedback signal $S_{fb}$.

The quantized signal $S_{quant}$ is then expressed with the same number of bits of the register 60 that are dedicated to the representation of the integer part of the samples NUM_φcomp[j] of the compensated signal $S_{comp}$ and therefore is less accurate than the accuracy of the compensated signal $S_{comp}$. In addition to this, the sigma-delta modulator 62, and therefore also the quantizer 70, operates at a frequency equal for example to the abovementioned frequency $f_d$ (for example 20 kHz), that is in synchronous mode with the input signal $S_{in}$.

In greater detail, the quantized signal $S_{quant}$ is formed by a succession of samples NUM_φ[n] of the integer type. The relationship NUM_φ[n]=NUM_φ$_{DC}$+NUM_ADD[j]+NUM_φ'[n], where the values of n and j are generated using frequencies equal to 20 kHz and 50 Hz respectively, is also valid (that is the value of NUM_ADD[j] changes every four hundred samples of NUM_φ[n]), where NUM_φ$_{DC}$+NUM_ADD[j] represents the corresponding mean value of NUM_φ[n] for a given value of j, and in which NUM_φ'[n] may be considered a small noise signal with a null mean introduced by the sigma-delta modulator 62. The mean value NUM_φ$_{DC}$+NUM_ADD[j] depends on the temperature T' to which the jth sample of the additional signal $S_{add}$ refers.

The demodulating signal S' is again formed from a square wave equal to a sign function with an argument of $\cos(\omega_d t - \varphi_{trim}[n])$, or by the sinusoidal signal $\cos(\omega_d t + \varphi_{trim}[n])$, where $\varphi_{trim}[n] = \varphi_{step}$*NUM_φ[n].

This being the case, assuming for simplicity that we are referring to the calibration step, and therefore assuming that NUM_ADD[j]=0, it can be demonstrated that the demodulated signal $S_{dem}$ is proportional to $C*\cos(\Delta\varphi - \varphi_{trim}[n]) - Q*\sin(\Delta\varphi - \varphi_{trim}[n])$. In addition to this, by noting that $\varphi_{trim}[n] = \varphi_{step}*(NUM\_\varphi_{DC}+NUM\_\varphi'[n])$, with NUM_φ$_{DC}$*$\varphi_{step}$=$\Delta\varphi(T_0)$ and with NUM_φ'[n], which can be considered to be a small signal with a null mean, it is found that the demodulated signal $S_{dem}$ is proportional to $C*\cos(\varphi_{step}*NUM\_\varphi'[n]) - Q*\sin(\varphi_{step}*NUM\_\varphi'[n])$; in addition to this, to a first approximation it can be assumed that $\cos(\varphi_{step}*NUM\_\varphi'[n]) \approx 1$ and $\sin(\varphi_{step}*NUM\_\varphi'[n]) \approx \varphi_{step}*NUM\_\varphi'[n]$. It can therefore be assumed that the demodulated signal $S_{dem}$ is directly proportional to $C - Q*\varphi_{step}*NUM\_\varphi'[n]$. It follows that while the Coriolis component C is unchanged, the component Q is modulated by NUM_φ'[n], which has a null mean, and the projection of the quadrature signal onto the Coriolis axis is therefore substantially reduced. Similar considerations apply in the case where the temperature is not the calibration temperature and therefore NUM_ADD[j]≠0.

Purely by way of example, the effect of the signal generator 58 can be better appreciated assuming that $\Delta\varphi(T_0)$ is equal to 40.5 mrad, that is it is equivalent to 6.6*$T_{PLL}$, where $T_{PLL}=1/f_{PLL}$ and $f_{PLL}$=20.48 MHz=$f_d$*$2^{10}$. In this case the user is able to identify NUM_φ$_{DC}$=6.6 through successive attempts.

The integer part and the fractional part of the value stored in the register 60 are then set to be equal to 6 and 0.6 respectively. Also the succession of the values NUM_φ[n] which forms the quantized signal $S_{quant}$ is given by a series of integer numbers which, as mentioned, are less accurate than the values stored in the register 60 and follow each other in time in such a way that the mean value of the succession is equal to 6.6 and the spectral density of the noise of the quantized signal $S_{quant}$ increases with frequency. Also, each value in the succession NUM_φ[n] is associated with a corresponding phase shift in the edges (for example the leading edges) of the square wave forming the demodulating signal S'. The step through which the positions of the edges, and therefore the phase, of the demodulating signal S' can be varied is again equal to $2\pi*f_d/f_{PLL}$, but the effect of the quadrature component on the Coriolis axis is reduced in comparison with what happens in the known art; in particular, it can be demonstrated that the reduction is equal to $2^{bit\_frac}$, where bit_frac indicates the number of bits of the register 60 dedicated to storing the fractional part of NUM_φ$_{DC}$. In addition to this, it is found that the noise introduced by the sigma-delta modulator 62, represented by the succession of values NUM_φ'[n], has a spectrum which extends substantially to frequencies higher than the frequencies of interest, that is the frequencies of the demodulated signal $S_{dem}$, which may for example have a range of between 0 Hz and 400 Hz.

From what has been described and illustrated above, the advantages which the present solution makes it possible to obtain are clearly apparent.

In particular the present demodulator makes it possible to maintain phase coherence between the input signal $S_{in}$ and the demodulating signal S' even when variations in temperature are present; in this way, to a first approximation, the impact of the phase and amplitude variations of the quadrature component on the performance of the gyroscope are annulled.

In conclusion it is clear that modifications and variants may be made to what has been described and illustrated hitherto, without thereby going beyond the scope of the protection of this disclosure as defined in the appended claims.

For example, the compensation function stored in the compensation stage 63 may be different from what has been described and/or may be stored in a different way. Also, the compensation function may be theoretical or predetermined by means of a temperature characterization of MEMS gyroscope 50. As an alternative, this compensation function may be estimated, possibly by using statistical methods, for example on the basis of the signals generated by the digital signals processor 34.

As far as the sigma-delta modulator 62 is concerned, this may be of a different type from that described. More generally, the sigma-delta modulator 62 may be replaced by any noise-shaping modulator which generates integer quantized samples in a per se known manner, introducing quantizing noise at frequencies higher than the frequency of interest, that is higher than the frequency of the demodulated signal $S_{dem}$.

It is also possible that the driving circuitry 10 and the processing stage 20 are formed on different dies.

According to a different embodiment (not shown), the sigma-delta modulator 62, and therefore also the quantizer 70, operates at a frequency of $2*f_d$; thus the output stage 64 receives two samples of the quantized signal $S_{quant}$ for every period equal to $1/f_d$. The demodulating signal S' may again be formed by a square wave equal to a sign function with an argument of $\cos(\omega_d t+\varphi_{trim}[n])$, or a sinusoidal signal $\cos(\omega_d t+\varphi_{trim}[n])$, where $\varphi_{trim}[n]=\varphi_{step}*NUM\_\varphi[n]$, but the values of $\varphi_{trim}[n]$ vary at a frequency of $2*f_d$. In this way, referring for example to the case where the demodulating signal S' is formed by a square wave, all the phase shifts introduced at a leading edge and a falling edge which are consecutive to each other depend respectively on two different (consecutive) samples of $\varphi_{trim}[n]$; the time distance between two such edges may then be different from $1/(2*f_d)$. An embodiment of this form makes it possible to distribute the noise over a band double in comparison with what has been described previously, with a consequent further reduction in the noise at the frequencies of interest.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A demodulator, comprising:
a register configured to store a phase calibration value;
a temperature sensor configured to perform a plurality of temperature sensings;
a compensation stage configured to generate a corresponding first sample for each temperature sensed on a basis of the sensed temperature, a calibration temperature, and a compensation function indicative of a relationship between a phase of an input signal of the demodulator and temperature, the input signal including an in-phase component and a quadrature component;
a combination stage configured to generate a plurality of second samples, each second sample being a function of the phase calibration value and a corresponding first sample;
a generation stage configured to generate a demodulating signal phase locked with the input signal, the demodulating signal having a phase which depends on the second samples; and
a demodulation stage configured to demodulate the in-phase component of the input signal through the demodulating signal.

2. The demodulator according to claim 1, wherein the input signal has a first frequency, wherein the phase calibration value and the first samples are of an integer type; wherein the generation stage is further configured to receive a clock signal that is phase locked with the input signal and has a second frequency equal to an integer multiple of the first frequency; and wherein the phase of the demodulating signal depends linearly on the second samples through a coefficient which is directly proportional to a ratio between the first and second frequencies.

3. The demodulator according to claim 1, wherein the register is configured to store the phase calibration value having an integer part and a fractional part; wherein the generation stage is further configured to generate for each of the second samples a corresponding succession of third samples of an integer type which have a mean value which is equal to a corresponding second sample; and wherein the phase of the demodulating signal further depends linearly on the third samples.

4. The demodulator according to claim 3, wherein the input signal has a first frequency and wherein the generation stage is further configured to receive a clock signal that is phase locked with the input signal and has a second frequency equal to an integer multiple of the first frequency; and wherein the phase of the demodulating signal depends linearly on the third samples through a coefficient that is directly proportional to a ratio between the first and second frequencies.

5. The demodulator according to 4, wherein the generation stage is configured to generate the third samples with a frequency equal to the first frequency or twice the first frequency.

6. The demodulator according to claim 3, wherein the generation stage includes a sigma-delta modulator.

7. The demodulator according to claim 1, wherein the demodulating signal is a square wave signal.

8. A control and sensing circuit for a microelectromechanical system (MEMS) gyroscope, comprising:
a demodulator, including:
a register configured to store a phase calibration value;
a temperature sensor configured to sense temperature over time and to store a sensed temperature value for each sensed temperature;
a compensation circuit configured to generate a corresponding first sample for each sensed temperature value on a basis of the sensed temperature value, a calibration temperature, and a compensation function defining a relationship between a phase of an input signal of the demodulator and temperature, the input signal including an in-phase component and a quadrature component;
a combination circuit configured to generate a plurality of second samples, each second sample being a function of the phase calibration value and a corresponding first sample;
a generation circuit configured to generate a demodulating signal phase locked with the input signal, the demodulating signal having a phase based on the second samples; and
a demodulation circuit configured to demodulate the in-phase component of the input signal through the demodulating signal; and
a driving circuit configured to be coupled to an oscillating system that generates the input signal, the driving circuit configured to generate a clock signal for the generation circuit and to provide the oscillating system with a driving signal having a frequency.

9. The control and sensing circuit according to claim 8, wherein the demodulator and the driving circuit are formed in a main die.

10. The control and sensing circuit according to claim 9, wherein the input signal is received from the oscillating system that is formed in a second die that is separated from the main die.

11. The control and sensing circuit according to claim 8, wherein the register is configured to store the phase calibration value having an integer part and a fractional part; wherein the generation circuit is further configured to generate for each of the second samples a corresponding succession of third samples of an integer type which have a mean value which is equal to a corresponding second sample; and wherein the phase of the demodulating signal depends linearly on the third samples.

12. A microelectromechanical system (MEMS) gyroscope, comprising:
a control and sense circuit including,
a demodulator, including:
a register configured to store a phase calibration value;
a temperature sensor configured to sense temperature over time and to store a sensed temperature value for each sensed temperature;
a compensation circuit configured to generate a corresponding first sample for each sensed temperature value on a basis of the sensed temperature value, a calibration temperature, and a compensation function defining a relationship between a phase of an input signal of the demodulator and temperature, the input signal including an in-phase component and a quadrature component;
a combination circuit configured to generate a plurality of second samples, each second sample being a function of the phase calibration value and a corresponding first sample;
a generation circuit configured to generate a demodulating signal phase locked with the input signal, the demodulating signal having a phase based on the second samples; and
a demodulation circuit configured to demodulate the in-phase component of the input signal through the demodulating signal; and
a driving circuit configured to receive the input signal, the driving circuit configured to generate a clock signal for the generation circuit and to provide an oscillating system with a driving signal having a frequency; and
the oscillating system coupled to the driving circuit and configured to generate the input signal, the input signal being indicative of an angular velocity experienced by the MEMS gyroscope.

13. The MEMS gyroscope according to claim 12, wherein said the control and sense circuit is formed in a first die and wherein the oscillating system is formed in a secondary die.

14. A method for demodulating an in-phase component of an input signal which is in-phase and quadrature modulated, the method comprising:
storing a phase calibration value;
sensing temperature over time and storing a corresponding temperature value for each sensed temperature;
generating, for each temperature value, a corresponding first sample on a basis of the temperature value, a calibration temperature, and a compensation function indicative of a relationship between a phase of the input signal and the temperature;
generating a plurality of second samples, each second sample being a function of the phase calibration value and the corresponding first sample;
generating a demodulating signal that is phase locked with the input signal, the demodulating signal having a phase that is based on the second samples; and
demodulating the input signal by means of the demodulating signal.

15. The demodulation method according to claim 14, wherein the input signal has a first frequency and wherein the phase calibration value and the first samples are integers, and where the method further comprises:
generating a clock signal that is phase locked with the input signal and has a second frequency that is equal to an integer multiple of the first frequency; and
wherein generating the demodulating signal includes generating the demodulating signal on the basis of the clock signal, the phase of the demodulating signal depending linearly on the second samples through a coefficient that is directly proportional to the relationship between the first and second frequencies.

16. The demodulation method according to claim 14, wherein storing the phase calibration value includes storing an integer part and a fractional part of the phase calibration value; and wherein the method further comprises:
for each of the second samples, generating a corresponding succession of third samples of an integer type which have a mean value equal to a corresponding second sample;
and wherein the phase of the demodulating signal depends linearly on the third samples.

17. The demodulation method of claim 16, wherein generating the corresponding succession of the third samples is through noise-shaping modulation.

18. The demodulation method according to claim 16, wherein the input signal has a first frequency, and wherein the method further comprises:
generating a clock signal which is phase locked with the input signal and has a second frequency equal to an integer number multiple of the first frequency; and
wherein generating the demodulating signal includes generating the demodulating signal on the basis of the clock signal so the phase of the demodulating signal is a linear function of the third samples through a coefficient that is directly proportional to the relationship between the first and second frequencies.

19. The demodulation method according to claim 15, further comprising:
for a Coriolis component of a sense signal generated by a microelectromechanical system (MEMS) gyroscope when experiencing an unknown angular velocity, performing a calibration step including:
arranging the MEMS gyroscope in a way in which it is set at a known temperature and experiences a known or zero angular velocity;
for each value of a plurality of test values of an integer type:
storing a test value;
generating a calibration demodulating signal phase locked with the sense signal generated by the MEMS gyroscope when placed at the known temperature and experiencing the known or zero angular velocity, the calibration demodulating signal having a phase which depends linearly on the test value; and
through a corresponding calibration demodulating signal, demodulating the sense signal generated by the MEMS gyroscope when set at the known temperature and experiencing the known or zero angular velocity in such a way as to generate a corresponding baseband signal; and
selecting the test value for which the corresponding baseband signal has a smallest quadrature error, the phase calibration value being equal to the selected test value, the calibration temperature being equal to the known temperature.

20. A method, comprising:
performing a calibration of a microelectromechanical system (MEMS) gyroscope that includes performing the calibration at a known temperature and arranging the MEMS gyroscope to experience a known or zero angular velocity, the calibration including, for each value of a plurality of test values having an integer part and a fractional part:
  storing a test value;
  generating through a noise-shaping modulator a succession of quantized values of an integer type, the quantized values having a mean value equal to the test value;
  generating a calibration demodulating signal phase locked with a sense signal generated by the MEMS gyroscope when experiencing the known or zero angular velocity, the demodulating signal having a phase which depends linearly on the quantized values; and
  through a corresponding calibration demodulating signal, demodulating the sense signal generated by the MEMS gyroscope to generate a corresponding baseband signal;
selecting the test value that provides the corresponding baseband signal having a smallest quadrature error; and
storing the selected test value.

* * * * *